United States Patent
Zuber et al.

(12) 
(10) Patent No.: US 10,417,282 B1
(45) Date of Patent: Sep. 17, 2019

(54) ENTITY MAPPING

(71) Applicant: Wells Fargo Bank, N.A., Charlotte, NC (US)

(72) Inventors: Dana K. Zuber, Berkeley, CA (US); Evelyn Ujanen, San Francisco, CA (US); Teresa Nieten, Chuluota, FL (US); Matthew P. Schlachtman, San Francisco, CA (US); Cigdem Gencer, San Francisco, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 435 days.

(21) Appl. No.: 14/806,200

(22) Filed: Jul. 22, 2015

(51) Int. Cl.
*G06F 7/02* (2006.01)
*G06F 16/00* (2019.01)
*G06F 16/901* (2019.01)
*G06F 16/182* (2019.01)
*G06F 16/31* (2019.01)
*G06F 16/22* (2019.01)

(52) U.S. Cl.
CPC ........ *G06F 16/9027* (2019.01); *G06F 16/182* (2019.01); *G06F 16/2246* (2019.01); *G06F 16/322* (2019.01)

(58) Field of Classification Search
CPC ........ G06F 17/30592; G06F 17/30327; G06F 17/30961; G06F 17/30598; G06F 17/30994; G06F 17/30333; G06F 17/30604; G06F 17/30734; G06F 17/30619; G06F 16/283; G06F 16/2246; G06F 16/9027; G06F 16/285; G06F 16/904; G06F 16/2264; G06F 16/288; G06F 16/367; G06F 16/316
See application file for complete search history.

(56) References Cited

U.S. PATENT DOCUMENTS

| | | | |
|---|---|---|---|
| 6,405,173 | B1 | 6/2002 | Honarvar et al. |
| 6,509,898 | B2 | 1/2003 | Chi et al. |
| 6,925,468 | B1 | 8/2005 | Bobbitt et al. |
| 6,944,619 | B2 | 9/2005 | Gruenwald |
| 7,325,201 | B2 | 1/2008 | Ferrari et al. |
| 7,426,520 | B2 | 9/2008 | Gorelik et al. |
| 7,516,139 | B2 | 4/2009 | Ziemann et al. |
| 7,523,121 | B2 | 4/2009 | Hoang et al. |
| 7,743,019 | B2 | 6/2010 | Shah et al. |
| 7,984,371 | B2 | 7/2011 | Zdenek |
| 8,090,696 | B2 | 1/2012 | Gouttas et al. |
| 8,165,878 | B2 | 4/2012 | Roberge et al. |
| 8,271,506 | B2 | 9/2012 | Martinez et al. |
| 8,510,302 | B2 | 8/2013 | Sweeney et al. |

(Continued)

*Primary Examiner* — Bruce M Moser
(74) *Attorney, Agent, or Firm* — Walter Haverfield LLP; James J. Pingor (57) ABSTRACT

Systems, methods, and other embodiments associated with entity mapping. According to one embodiment, a method comprises generating trees based, at least in part, on data. The data is associated with dimensions. A tree includes nodes that are not defined by the dimensions of the data. The method further includes performing statistical tree analysis to calculate results for the trees. The statistical tree analysis is performed independent of the dimensions of the data. A table of a composite result set is created by unionizing the results for the at least two trees. The nodes of the trees are parsed based, at least in part, on the composite result set. The at least two trees can then be visually displayed.

20 Claims, 8 Drawing Sheets

(56) References Cited

U.S. PATENT DOCUMENTS

| | | |
|---|---|---|
| 8,874,595 B2 | 10/2014 | Yeung et al. |
| 2002/0067360 A1* | 6/2002 | Chi .................. G06F 17/30014 345/441 |
| 2005/0132304 A1* | 6/2005 | Guido ............... G06F 17/30994 715/853 |
| 2006/0161485 A1 | 7/2006 | Meldahl |
| 2009/0234710 A1 | 9/2009 | Belgaied Hassine et al. |
| 2010/0287146 A1 | 11/2010 | Skelton et al. |
| 2013/0031133 A1 | 1/2013 | Adzic et al. |
| 2013/0036222 A1* | 2/2013 | Mogalayapalli ... G06Q 10/0631 709/224 |

\* cited by examiner

```
id        path                                                              level
--------  ----------------------------------------------------------------  -----
38547179  74983424->82374166->40277260->38495943->75655701->38547179            6
38547179  74983424->40277260->38495943->75655701->38547179                      5
82374166  74983424->40277260->38495943->82374166                                4
38495943  74983424->82374166->40277260->38495943                                4
82374166  74983424->38495943->40277260->82374166                                4
38547179  74983424->38495943->75655701->38547179                                4
```

```
source_id  dest_id    source_rol_cd  source_rol_ky  acct_ky    dest_rol_cd  dest_rol_ky
---------  ---------  -------------  -------------  ---------  -----------  -----------
23621098   78727552   PO                        172  536409558  OO                    64
19080479   51565918   PO                        172  283003410  OO                    64
35209122   61440535   PO                         15  392797382  NO                   137
  137286   82710314   PO                         33  279127159  NO                     1
  137286   170539426  PO                         33  279127159  NO                     1
80364710   58450803   PO                        172   48683202  OO                    64
```

ENTITY MAPPING

BACKGROUND

A tree data structure can be defined recursively as a collection of nodes starting at a root node. A node is a data structure having at least one value, together with a list of references to nodes, referred to as children. The root node is the top node of the tree. A tree can be analyzed mathematically as a whole. For example, looking at a tree as a whole, one can talk about "the parent node" of a given node, but in general a given node only contains the list of its children, but does not contain a reference to its parent (if any). The children of a node define an ordered forest. For example, a forest may be defined by the union of subtrees given by all the children or equivalently taking the subtree given by the node itself and erasing the root. Just as subtrees are natural for recursion (as in a depth-first search), forests are natural for corecursion (as in a breadth-first search).

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

Described herein are examples of systems, methods, and other embodiments associated with entity mapping. In one embodiment, the entity mapping may be associated with a financial institution. For example, entity mapping may include a process to identify and visualize relationships between customers of the financial institution and accounts held at the financial institution. The identification may start by representing a customer as a node. Relationships may be built by associating customers with other customers and accounts. Statistical analysis can be performed on the collection of relationships referred to as a forest. Accordingly, statistical tree analysis can be applied to an existing databank of a financial institution that connects customers to their accounts to identify all of the chains of relationships connecting customers through common accounts. Graphing algorithms can then be applied to determine each of the connections along with the type of relation specified by a user.

This process breaks out identification of the chain of relationship from a single root node compared to the forest of data containing trees starting from every possible root node. The tree algorithms are used due to the unique layout of data according to the financial institution. Accordingly, relationships between customers and other customers and/or accounts can be interpolated without the need for an account relation as an intermediate node. Furthermore, entity mapping yields the ability to push a visualization of each customer's connections to all areas of the business. Additionally, the dimensional aspects of the customers can be customized at will.

The following description and drawings set forth certain illustrative aspects and implementations. These are indicative of but a few of the various ways in which one or more aspects may be employed. Other aspects, advantages, or novel features of the disclosure will become apparent from the following detailed description when considered in conjunction with the drawings. While embodiments may be described with respect to customers and accounts of a financial institution, the systems, methods, and embodiments described herein may be used in other applications, such as industrial commercial and individualized systems.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Embodiments or examples illustrated in the drawings are disclosed below using specific language. It will nevertheless be understood that the embodiments or examples are not intended to be limiting. Any alterations and modifications in the disclosed embodiments and any further applications of the principles disclosed in this document are contemplated as would normally occur to one of ordinary skill in the pertinent art. Described herein are examples of systems, methods, and other embodiments associated with entity mapping.

Prior art tree functions work on the premise of creating a relationship tree with nodes connecting across a single dimension and do not include detail on the node itself. A dimension is at least one characteristic used to identify connections between customers. Characteristics may include demographic features, financial behavior and types, amount of financial assets, customer information, account information, etc. For example, entity mapping could be used to connect customers who share the same account or live in the same zip code. Rather than using a single dimension, embodiments disclosed herein create a relationship tree with nodes connecting across multiple dimensions of interconnectivity and a virtually limitless amount of connection information.

Figure 1:
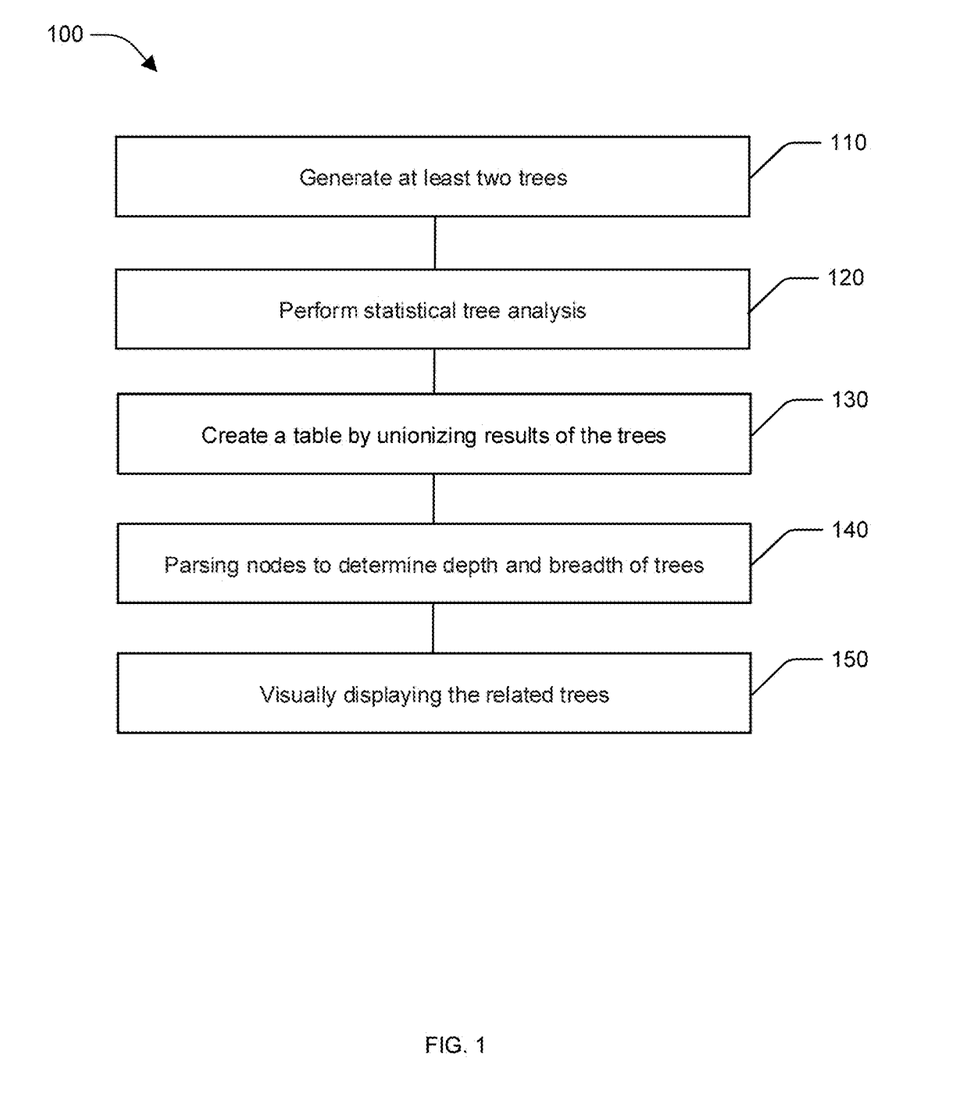
FIG. 1 illustrates one embodiment of a method associated with entity mapping.

FIG. 1 is an illustration of an example embodiment of a method 100 associated with entity mapping. At 110, trees are generated based on sets of data. A set of data includes information about dimensions of data, such as customers and accounts. Specifically data points, regardless of the dimension of data, are represented as nodes. Accordingly, a node represents information about the data point. For example, a root node may represent a particular customer. Child nodes of the root node may represent accounts that the particular customer holds. Likewise, child nodes may represent other customers that the particular customer is associated with (e.g., joint account holders, joint debtors, etc.). Accordingly, the dimension of the data does not dictate of the generation of a node. Thus, the nodes are dimensionless. Because the nodes receive the similar treatment regardless of type, the dimensional aspects of the data are uniform. The dimensional aspects of the customers and/or accounts can be customized at will.

At 120, statistical tree analysis is performed. The statistical tree analysis connects dimensions of data using relational information. Suppose that the dimensions represent types of data such as customer and account. The trees are then generated with nodes having both customer and account information. Thus, a customer represented as a root node would be connected to all of their accounts. Suppose that a customer has a checking account, a savings account, and a mortgage with a financial institution. The statistical tree analysis makes a connection between the user and each of the accounts. The connection is recorded as relational information. Relational information regarding the relationship between two nodes is stored as metadata of one or both nodes. Accordingly, in one embodiment, the statistical tree analysis is a flow through a tree where each node represents a dimension of the data, and nodes the path from node to node is based on connection rules. Connection rules define relationships between nodes in a tree. For example, nodes may represent customers and the rule connecting nodes is a shared account.

In addition to connecting dimensions, performing the statistical tree analysis, at 120, identifies chains of related data. As described above with respect to accounts, the nodes also include dimensions associated with customers linked to other customers. For example, the statistical tree analysis identifies relationships connecting customers through common accounts. For example, assume that the first customer is a joint account holder with a second customer. Accordingly, the statistical tree joins customer that are linked by virtue of being joint account holders, holding common debt or assets, family relationships, etc.

The statistical tree analysis results in nodes of the trees being placed in the same dimension regardless of the type of node. For example, nodes of customers and accounts are arranged in the same dimension. The nodes include relationship information identifying parameters such as node type (e.g., customer, account), relationship type (e.g., co-signer, parent/child), confidence, and rank of value. The relationship data is stored in the metadata of the node.

At 130, the results of the at least two trees are unionized in a table to create a composite result set. In one embodiment, the at least two trees is a forest of trees, each tree having a root node representing a customer or an account. The root nodes are available in the result set. Accordingly, self-joining the source table with at least two different sets of filter parameters generate a table capable of accessing any customer and determining which accounts, if any, share a customer (e.g., a primary owner, joint account holder, etc.) and also what customers are related to the account via a non-primary owner relations. For example, two customers may be related through a network of accounts rather than on a single joint account. Thus, chains of relationships can be identified from a single root node as compared to the forest of data.

In one embodiment, the results are unionized using a tree-traversing algorithm. Specifically, the tree-traversing algorithm is applied to the generated tree. A range conditions, such as a "true" condition, are used to identify root nodes. This two-step connection of performing a statistical tree analysis, at 120, and creating a table, at 130, may be the recursively used.

At 140, nodes are parsed using delimiters to determine depth and breadth of the trees from every root node. For example, the trees may be parsed to facilitate a look-up function on the table. In one embodiment, the parsing is scalable such that the method for parsing can be used in a forest level statistical model.

At 150, visually displaying a forest of related trees using a graphical representation of the depth and breadth of specified nodes. In one embodiment, the trees generated at 110 form a forest. For example, as will be discussed further in FIG. 2A, a tree may use a single customer as the root node. Accordingly, in forest, as will be further discussed in FIG. 2B, multiple trees may be connected by relationships between both root and child nodes. Accordingly, a single customer may be graphically represented with other customers and accounts such that the interplay between customers and accounts can be viewed holistically rather than granularly. Accordingly, relationships between customers and other customers and/or accounts can be interpolated without the need for an account relation as an intermediate node. Thus, these relationships can be interpolated based on any relationship.

While the examples described herein are in terms of customers and accounts, other indicia could also be used in accordance with the systems and methods described herein. For example, users of a massively multi-player online role-playing game may be linked to different characters. Thus, while terminology of customers and account is used throughout for clarity and convenience, the terms are not intended to be limiting.

Figure 2A:
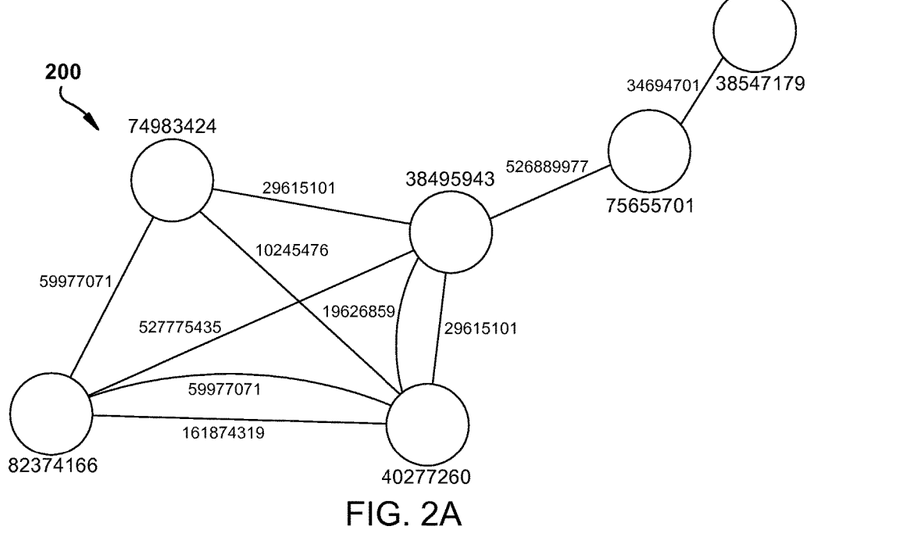
FIG. 2A illustrates one embodiment of a graph of a tree based on a single customer.

FIG. 2A illustrates one embodiment of a graph of a tree 200 based on a single customer. Suppose that a financial institution wants to determine how a customer is related to other customers. For example, the connections may be defined by the connection rules. An efficient way to present this information is as the graph of the tree 200 in which the particular customer is the root node. Specifically, visually representing the customer relationships as a graph of the tree 200 illustrates how different customers and/or accounts are related.

Figure 2B:
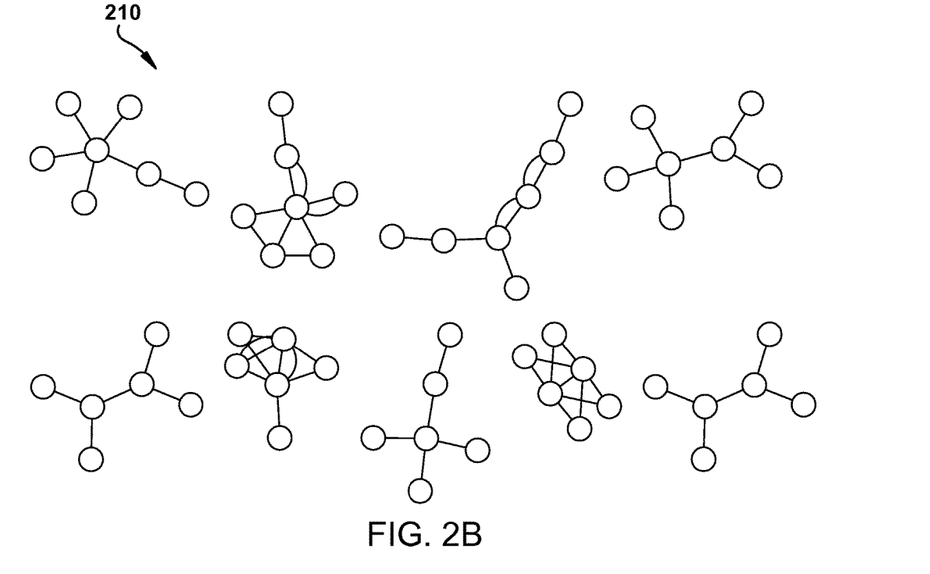
FIG. 2B illustrates one embodiment of a graph of a forest based on a multiple customers.

FIG. 2B illustrates one embodiment of a graph of a forest 210 based on a multiple customers. Specifically, FIG. 2B illustrates the forest 210 as having eight trees representing the relationships of eight different customers. Suppose that a customer is irate and discussing multiple problems with a financial institution employee. The financial institution employee can use the graph of the forest 210 to determine how the customer imprint at the financial institution affects other customers and accounts. This may inform how the financial institution employee ameliorates the customer's problems.

Figure 3:
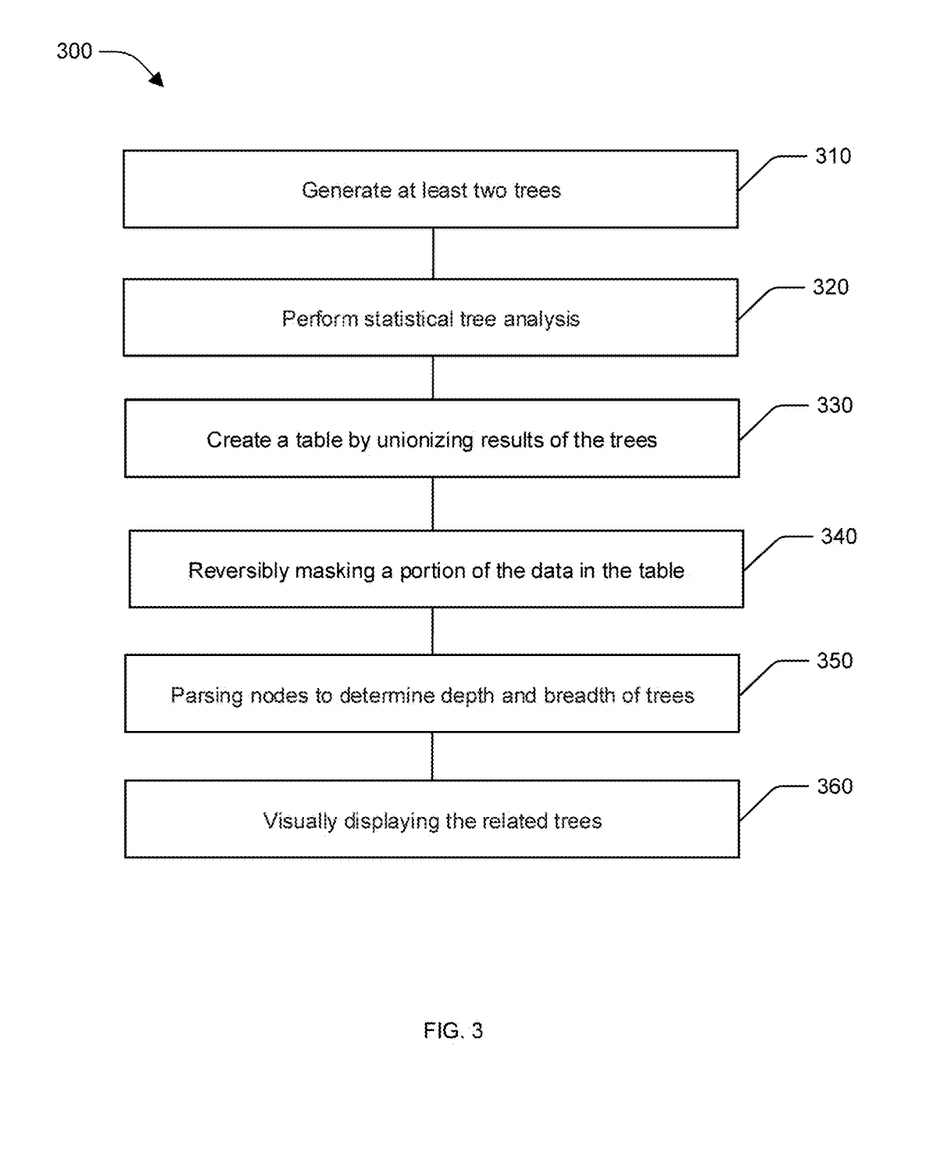
FIG. 3 illustrates one embodiment of a method including masking in entity mapping.

FIG. 3 illustrates one embodiment of a method for entity mapping associated with masking. Steps 310, 320, 330, 350, and 360 operate in a similar manner as steps 110, 120, 130, 140, and 150, respectively, as described with respect to FIG. 1. Therefore, at 310, at least two trees are generated. At 320, statistical tree analysis is performed on the at least two trees. At 330, a table is created by unionizing the resulting trees.

At 340, the data of a node is masked. In one embodiment, customer identity and/or customer account identification numbers are masked for security reasons. The mask may be reversible. For example, the masking may support two different identification dimensions to be looked at in a single column and be able to determine the difference between the different identification dimensions. At 350, nodes of the at least two trees are parsed to determine the depth and breadth of the trees. At 360 related trees are visually displayed.

Figure 4:
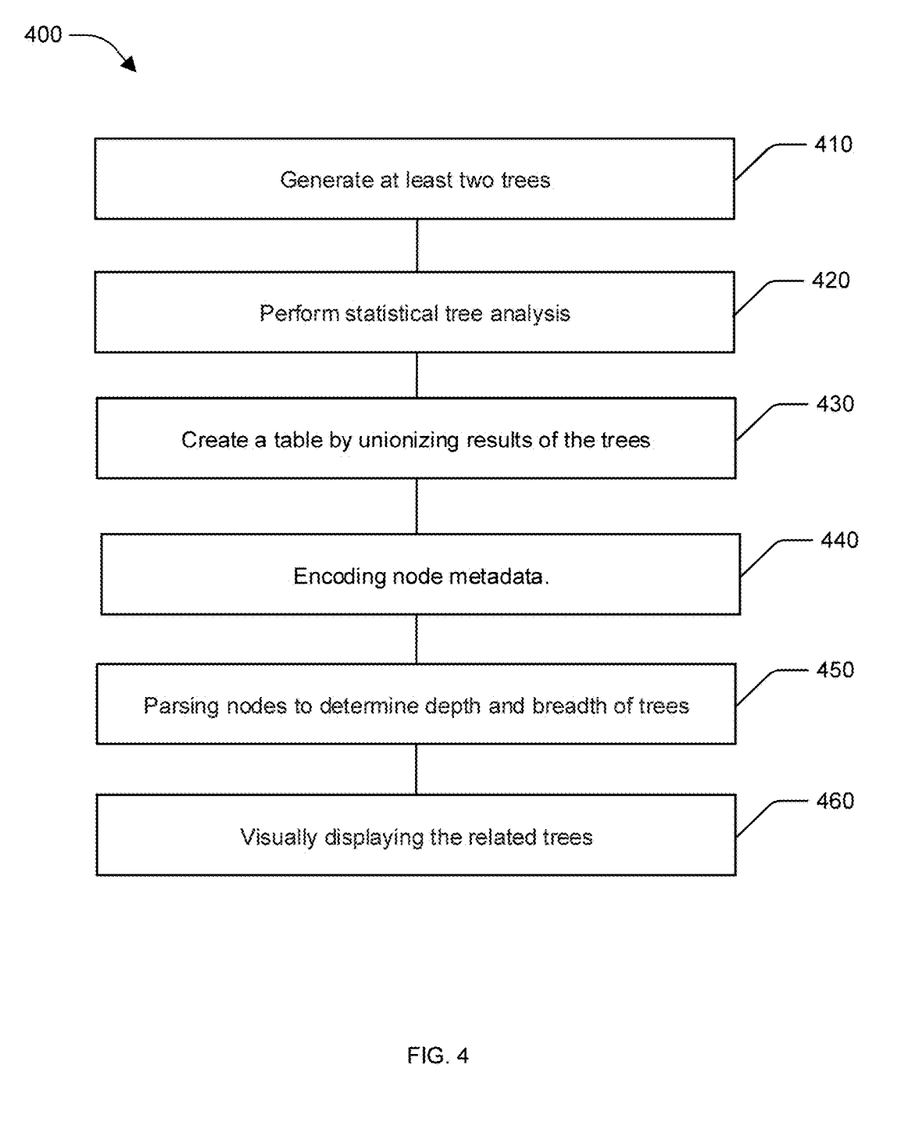
FIG. 4 illustrates one embodiment of a method including encoding in entity mapping

FIG. 4 illustrates one embodiment of a method for entity mapping associated with serialization enhancement Steps 410, 420, 430, 450, and 460 operate in a similar manner as steps 110, 120, 130, 140, and 150, respectively, as described with respect to FIG. 1. Therefore, at 410, at least two trees are generated. At 420, statistical tree analysis is performed on the at least two trees. At 430, a table is created by unionizing the resulting trees.

At 440, aspects of the nodes metadata are encoded. The nodes metadata may include node type, relationship type, relationship code, data source, confidence, rank of value, etc. In one embodiment, the encoding is performed by a data delimiter. The encoding uses a serialization and deserialization function to not only allow for both account and customer to be in the same dimension, but now any type, along with permanent relationship information. At 450, nodes of the at least two trees are parsed to determine the depth and breadth of the trees. At 460 related trees are visually displayed.

Figure 5:
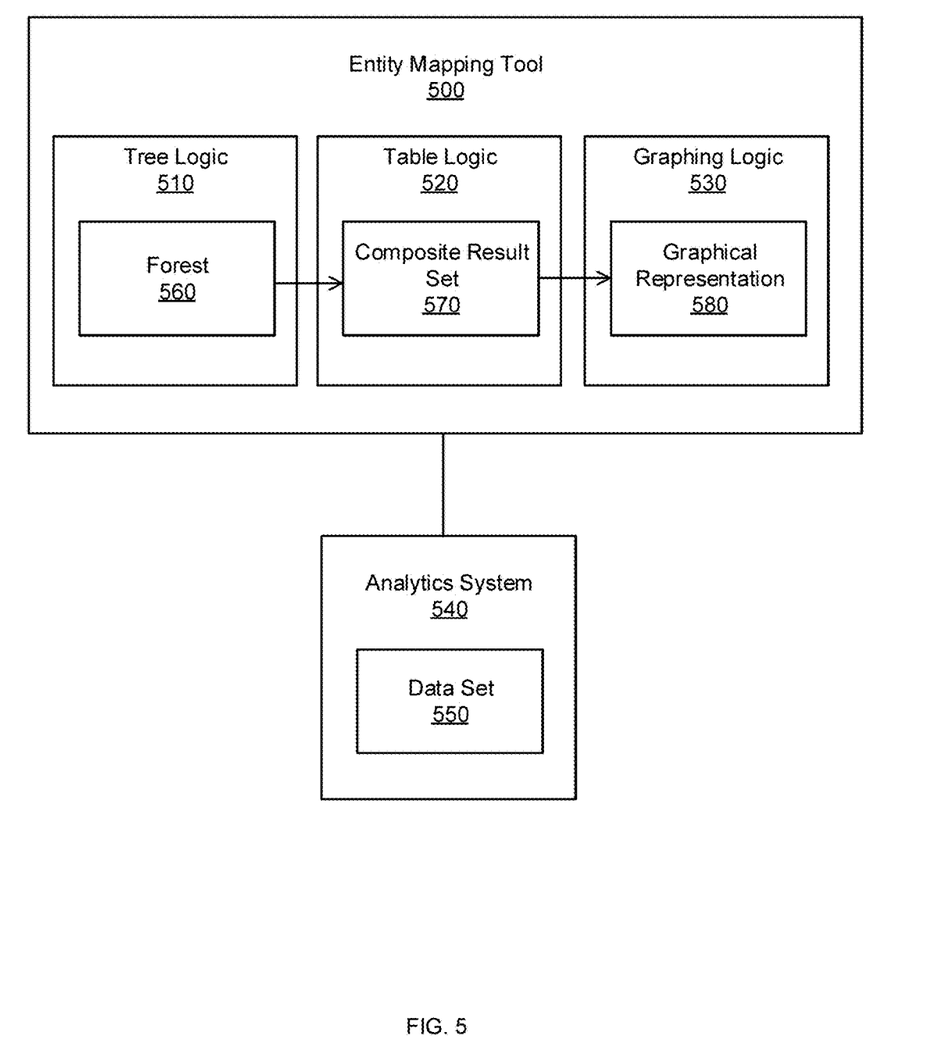
FIG. 5 illustrates one embodiment of an entity mapping tool associated with entity mapping.

FIG. 5 illustrates one embodiment of an entity mapping tool 500 associated with entity mapping. In one embodiment, the entity mapping tool 500 includes a tree logic 510, a table logic 520, and a graphing logic 530. The entity-mapping tool 500 works in conjunction with an analytic system 540 of an organization (e.g., corporation, non-profit group, financial institution, etc.). The analytics system 540 may be used by the organization to store, manage, and receive data.

The tree logic 510 receives a data set 550 from the analytics system 540. The tree logic uses the data set 550 to generate at least one tree of forest 560. As discussed above, the data set 550 includes data points regarding dimensions of data, such as customers and accounts. The data points are represented as nodes in a tree. A node represents information about the data point including the dimension. For example, the nodes may include information about an entity regardless of whether that entity is a customer or account. Because the nodes receive the similar treatment regardless of type, the dimensional aspects of the data are uniform.

The tree logic 510 uses the nodes to perform statistical tree analysis. The statistical tree analysis connects the two dimensions of data using relational information. By virtue of connecting nodes, the statistical tree analysis identifies chains of related data. Accordingly, nodes are connected into chain regardless of type. Thus, the statistical tree analysis results in nodes of the trees being placed in the same dimension regardless of the type of node. For example, nodes of customers and accounts are arranged in the same dimension. The nodes also include relationship information identifying parameters about the node.

The table logic 520 unionizes the information from the trees in a table to create a composite result set 570. Self-joining the source table with at least two different sets of filter parameters generate the composite result set 570. The composite result set 570 can be used to access a customer and determine which accounts, if any, share a customer (e.g., a primary owner, joint account holder, etc.) and also what customers are related to the account via a non-primary owner relations. As discussed above, the composite result set may be unionized using a tree-traversing algorithm. The table logic 520 may parse the nodes using delimiters to determine depth and breadth of the trees from every root node. For example, the composite result set 570 may be parsed to facilitate a look-up function.

Suppose that the entity mapping tool 500 receives a request from the analytics system 540 for information about a particular customer. The graphing logic 530 generates a graphical representation 580 that can be displayed so that connections between the particular customer and other customers and/or accounts can be visualized.

Figure 6A:
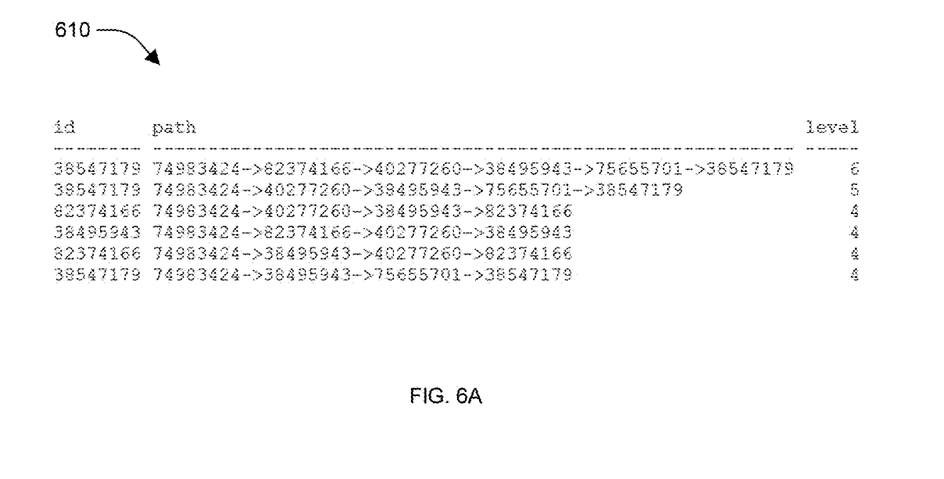
FIG. 6A illustrates example tree results associated with one embodiment of entity mapping.

FIG. 6A illustrates example tree results 610 associated with one embodiment of entity mapping. The tree results 610 identify specific nodes of a tree, a pathway through the tree that terminates at the specific node, and the level of the specific node. The data of the tree result 610 is an example of the types of data that general tree results may include. However, more or less data may be included in the tree results 610. For example, the tree results 610 may include edge information, source data, etc.

Figure 6B:
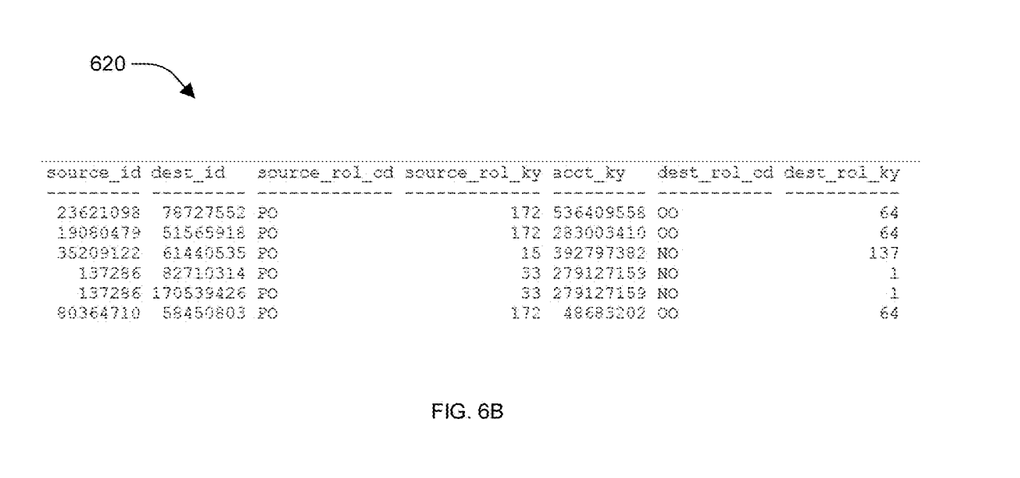
FIG. 6B illustrates an example relationship table associated one embodiment of entity mapping.

FIG. 6B illustrates an example relationship table 620 associated one embodiment of entity mapping. The relationship table 620 may be generated from tree results, such as the tree results 610 shown in FIG. 6A. The relationship table 620 may be a customer/account relationship table that facilitates identifying links between customers and account of a financial institution.

Figure 7:
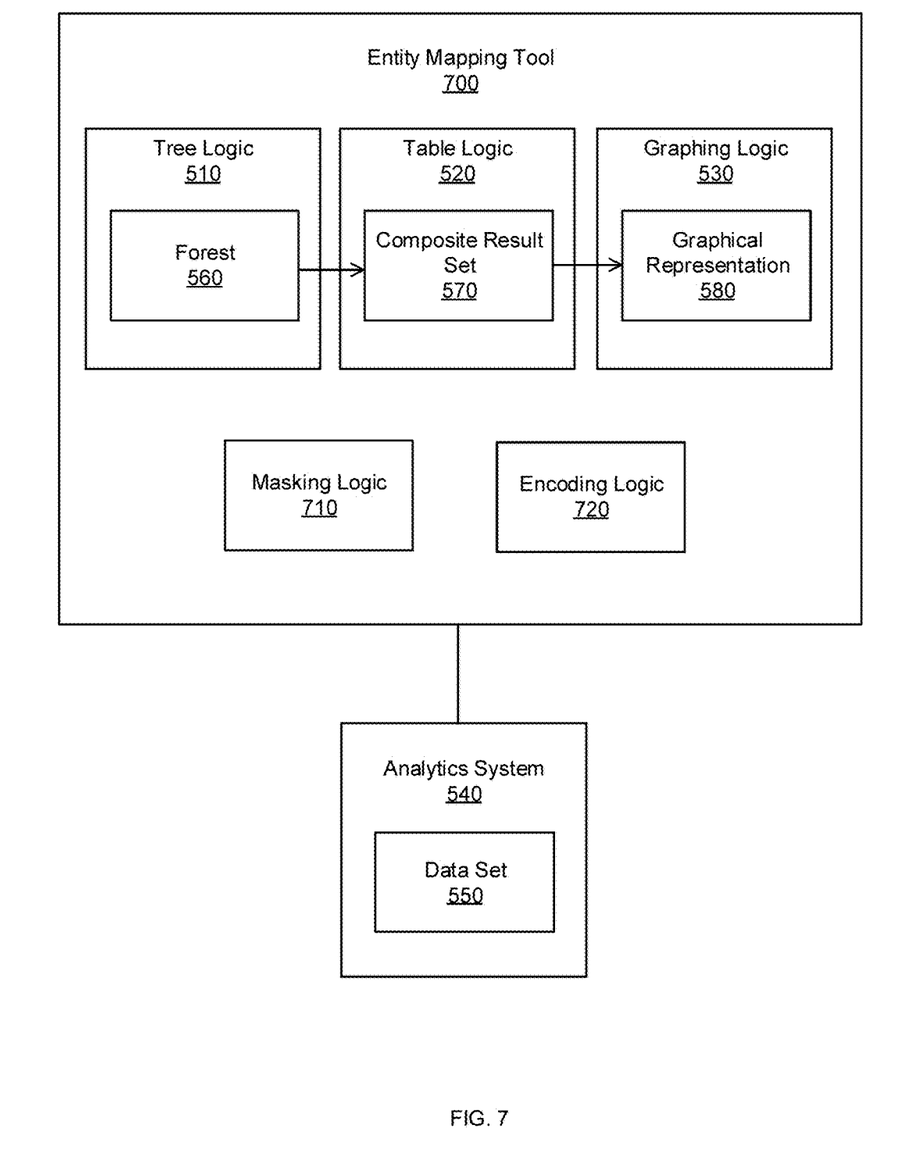
FIG. 7 illustrates one embodiment of an entity mapping tool having a masking logic and an entity logic associated with entity mapping.

FIG. 7 illustrates one embodiment of an entity mapping tool 700 having a masking logic and an entity logic associated with entity mapping. The tree logic 510, a table logic 520, and a graphing logic 530 operate in a similar manner as described with respect to FIG. 5. The entity-mapping tool 700 works in conjunction with an analytic system 540 having a data set 550, also as described with respect to FIG. 5. As described above, the tree logic generates a forest 560, the table logic 520 uses the forest 560 to calculate a composite result set 570, which can then be used to illustrate a graphical representation 580. The entity mapping tool 700 further includes a masking logic 710 and an encoding logic 720.

The masking logic 710 masks information of the nodes in the forest 560. Accordingly, the masking logic 710 may work in contention with the tree logic 510. As discussed with respect to FIG. 3, the masking logic may mask data for security reasons. Accordingly, the mask may be reversible once security restrictions are met. Therefore, the masking logic may mask or reverse masking in conjunction with the table logic 520.

The encoding logic 720, may encode the metadata of the nodes. As discussed above the metadata may include node type, relationship type, relationship code, data source, confidence, rank of value, etc. In one embodiment, the encoding logic 720 may include a data delimiter. The encoding logic 720 may use serialization and deserialization function to not only allow for both account and customer to be in the same dimension, but now any type, along with permanent relationship information.

Figure 8:
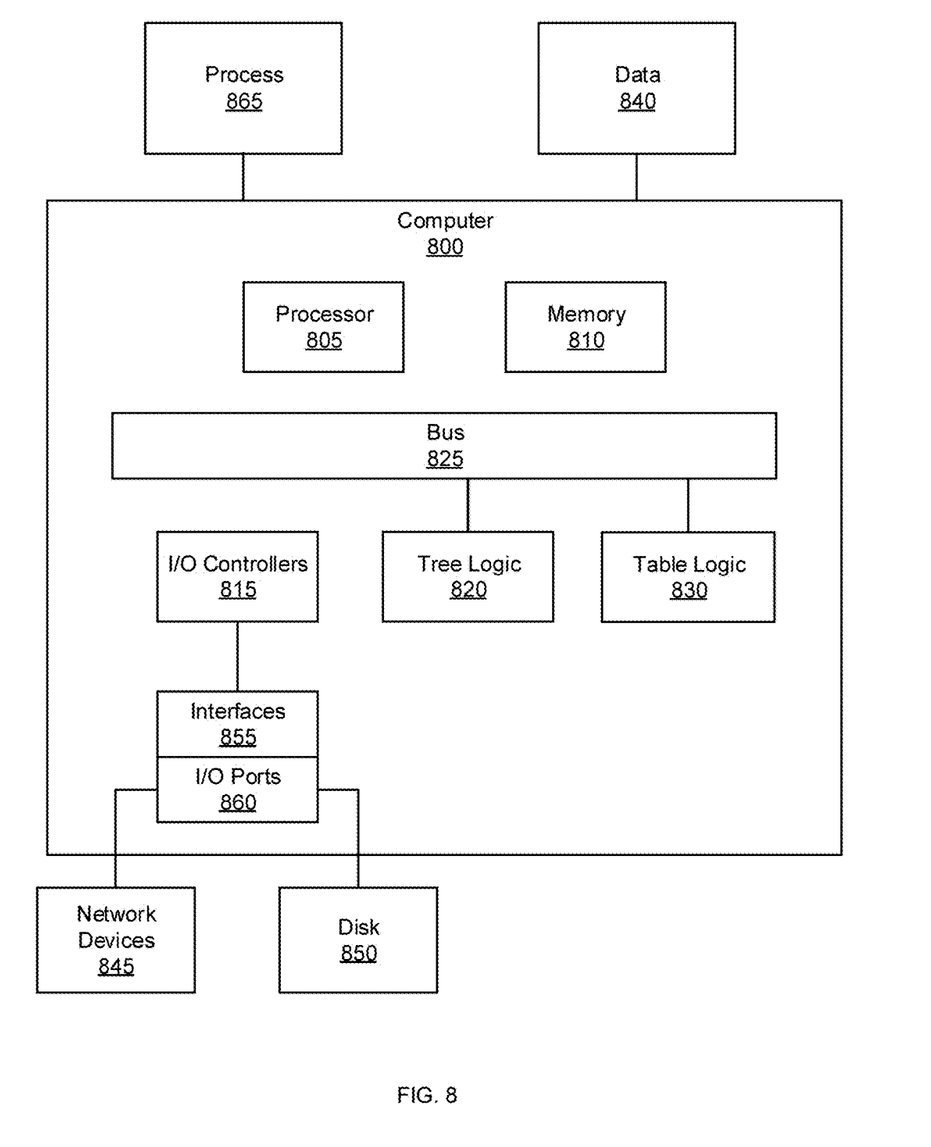
FIG. 8 illustrates one embodiment of an example computer environment associated entity mapping.

FIG. 8 illustrates one embodiment of an example computer environment associated entity mapping. The computer environment in which the systems and methods described herein, and equivalents, may operate may include a computer 800. The computer includes a processor 805, a memory 810, and input/output ports 860 operably connected by a bus 825. In one example, the computer 800 may include a tree logic 820 and a table logic 830. In different examples, the tree logic 820 and the table logic 830 may be implemented in hardware, a non-transitory computer-readable medium with stored instructions, firmware, and/or combinations thereof. While the tree logic 820 and the table logic 830 are illustrated as hardware components attached to the bus 825, it is to be appreciated that in one example, the tree logic 820 and/or the table logic 830 may be implemented in the processor 805.

In one embodiment, the tree logic 820 is a means (e.g., hardware, non-transitory computer-readable medium, firmware) for generate at least one tree of forest. The tree logic 820 is further a means to perform a statistical tree analysis. The table logic 830 is a means (e.g., hardware, non-transitory computer-readable medium, firmware) for unionizing the information from the trees in a table to create a composite result set. The means may be implemented, for example, as an ASIC programmed to trigger the tree logic to process transactions differently in each environment. The means may also be implemented as stored computer executable instructions that are presented to computer 800 as data 840 that are temporarily stored in memory 810 and then executed by processor 805.

Generally describing an example configuration of the computer 800, the processor 805 may be a variety of various processors including dual microprocessor and other multiprocessor architectures. A memory 810 may include volatile memory and/or non-volatile memory. Non-volatile memory may include, for example, ROM, PROM, and so on. Volatile memory may include, for example, RAM, SRAM, DRAM, and so on.

A disk 850 may be operably connected to the computer 800 via, for example, an input/output interface (e.g., card, device) 855 and an input/output port 860. The disk 850 may be, for example, a magnetic disk drive, a solid state disk drive, a floppy disk drive, a tape drive, a Zip drive, a flash memory card, a memory stick, and so on. Furthermore, the disk 850 may be a CD-ROM drive, a CD-R drive, a CD-RW drive, a DVD ROM, and so on. The memory 810 can store a process 865 and/or a data 840, for example. The disk 850 and/or the memory 810 can store an operating system that controls and allocates resources of the computer 800.

The bus 825 may be a single internal bus interconnect architecture and/or other bus or mesh architectures. While a single bus is illustrated, it is to be appreciated that the computer 800 may communicate with various devices, logics, and peripherals using other busses (e.g., PCIE, 1394, USB, Ethernet). The bus 825 can be types including, for example, a memory bus, a memory controller, a peripheral bus, an external bus, a crossbar switch, and/or a local bus.

The computer 800 may interact with input/output devices via the i/o interfaces 806 and the input/output ports 860. Input/output devices may be, for example, a keyboard, a microphone, a pointing and selection device, cameras, video cards, displays, the network devices 845, the disk 850, and so on. The input/output ports 860 may include, for example, serial ports, parallel ports, and USB ports.

The computer 800 can operate in a network environment and thus may be connected to the network devices 845 via the I/O interfaces 855, and/or the I/O ports 860. Through the network devices 820, the computer 800 may interact with a network. Through the network, the computer 800 may be logically connected to remote computers. Networks with which the computer 800 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the method.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium", as used herein, is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage medium may include, but are not limited to, a computer-readable medium, a floppy disk, a flexible disk, a hard disk, a magnetic tape, other magnetic medium, an ASIC, a CD, other optical medium, a RAM, a ROM, a memory chip or card, a memory stick, and other media that can store instructions and/or data. Computer storage medium described herein are limited to statutory subject matter under 35 U.S.C § 101.

"Logic", as used herein, includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm to perform one or more of the disclosed functions/methods, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic component. Similarly, where a single logic component is described, it may be possible to distribute that single logic component between multiple physical logic components. In some embodiments, one or more of the components and functions described herein are implemented using one or more of the logic components. Logic as described herein is limited to statutory subject matter under 35 U.S.C § 101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks. The methods described herein is limited to statutory subject matter under 35 U.S.C § 101.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims, which satisfy the statutory subject matter requirements of 35 U.S.C. § 101.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A method for improving computing structures, comprising:
    generating trees based, at least in part, on data, wherein the data is associated with dimensions, and wherein generating a tree includes transforming data into a structure of nodes that are not defined by the dimensions of the data,
        wherein nodes are robust against type-handling;
    performing statistical tree analysis to calculate results for the trees, wherein the statistical tree analysis is performed independent of the dimensions of the data, and is performed on a basis of a set of connection rules;
    creating a table of a composite result set by unionizing the results for the trees,
        wherein the table of composite result set captures chain linkages for a plurality of designated dimensions;
    parsing nodes of the trees based, at least in part, on the composite result set,
        wherein parsing nodes uses a delimiter to determine depth and breadth of associated trees connecting across multiple dimensions through the captured chain linkages; and
    visually displaying a forest of the trees.

2. The method of claim 1, wherein a dimension is a characteristic of a node.

3. The method of claim 1, wherein the statistical tree analysis connects the dimensions of the data using relational information, and wherein the relational information is stored as metadata of a node.

4. The method of claim 1, wherein each node has a structure that contains a dimension of the data, and a path from node to node that is based, at least in part, on the set of connection rules, and wherein at least a subset of the set of connection rules define relationships between the nodes in a tree.

5. The method of claim 1, wherein the statistical tree analysis connects dimensions of data using relational information.

6. The method of claim 1, wherein the statistical tree analysis identifies chains of related data between the nodes.

7. The method of claim 1, wherein parsing the nodes utilizes delimiters to determine the depth and breadth of the trees to facilitate a look-up function on the table.

8. The method of claim 1, wherein the nodes contain values associated with the data, the method further comprising masking the values.

9. The method of claim 1, further comprising encoding metadata associated with the nodes.

10. A system, comprising:
    a tree logic configured to:
        receive a data set from an analytics engine,
            generate at least one tree based, at least in part, on the data set, wherein data of the data set is associated with dimensions, and wherein a tree includes nodes that are not defined by the dimensions of the data, wherein nodes are robust against type-handling; and
        perform a statistical tree analysis that connects multiple dimensions of data, and that is performed on a basis of a set of connection rules; and
    a table logic configured to:
        unionize the data of the nodes of the trees in a composite result set, and create a table based, at least in part, on the composite result from the unionized data,
            wherein the table of composite result set captures chain linkages for a plurality of designated dimensions; and
    a graphing logic configured to visually render the trees.

11. The system of claim 10, wherein a dimension is a characteristic of a node.

12. The system of claim 10, wherein the statistical tree analysis connects the dimensions of data of the data sets using relational information.

13. The system of claim 10, wherein the statistical tree analysis identifies chains of related data between the data.

14. The system of claim 10, wherein the statistical tree analysis connects the dimensions of the data using relational information, and wherein the relational information is stored as metadata of a node.

15. A non-transitory computer-readable medium storing computer-executable instructions that when executed by a computer cause the computer to perform a method, the method comprising:
- generating at least two trees based, at least in part, on data, wherein the data is associated with dimensions, wherein generating a tree includes transforming data into nodes that are not defined by the dimensions of the data, and wherein nodes are robust against type-handling;
- performing statistical tree analysis to calculate results for the at least two trees, wherein the statistical tree analysis is performed independent of the dimensions of the data, and is performed on a basis of a set of connection rules;
- creating a table of a composite result set by unionizing the results for the at least two trees, wherein the table of composite result set captures chain linkages for a plurality of designated dimensions;
- parsing nodes of the at least two trees based, at least in part, on the composite result set, wherein parsing nodes uses a delimiter to determine depth and breadth of associated trees connecting across multiple dimensions through the captured chain linkages; and
- visually displaying a forest of the at least two trees.

16. The non-transitory computer-readable medium of claim 15, wherein a dimension is a characteristic of a node.

17. The non-transitory computer-readable medium of claim 15, wherein the statistical tree analysis connects the dimensions of the data using relational information.

18. The non-transitory computer-readable medium of claim 15, wherein the statistical tree analysis identifies chains of related data.

19. The non-transitory computer-readable medium of claim 15, further comprising masking the data associated with a node.

20. The non-transitory computer-readable medium of claim 15, further comprising encoding metadata associated with the nodes.

* * * * *